May 12, 1936. M. E. BRENDEL 2,040,072
WEIGHT INDICATING MECHANISM AND THE LIKE
Filed Sept. 9, 1932 11 Sheets-Sheet 2

INVENTOR
MAX E. BRENDEL
BY Roland C. Rehm
ATTORNEY

May 12, 1936.  M. E. BRENDEL  2,040,072
WEIGHT INDICATING MECHANISM AND THE LIKE
Filed Sept. 9, 1932   11 Sheets-Sheet 3

INVENTOR
MAX E. BRENDEL
BY Roland C. Rehm
ATTORNEY

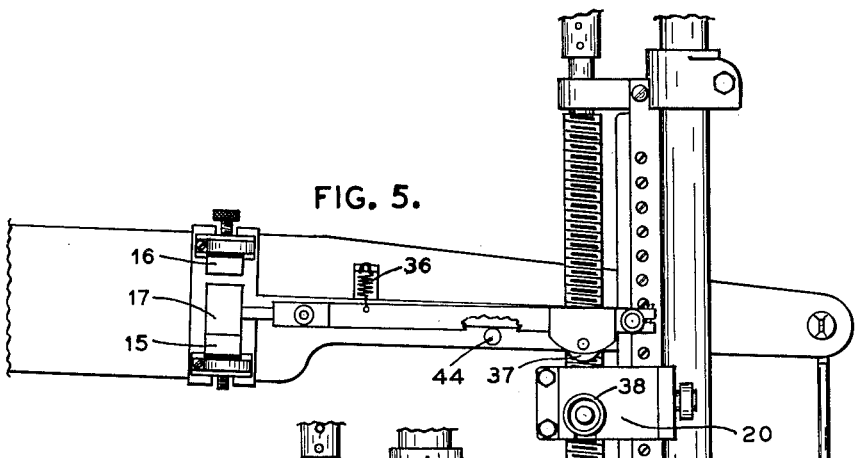
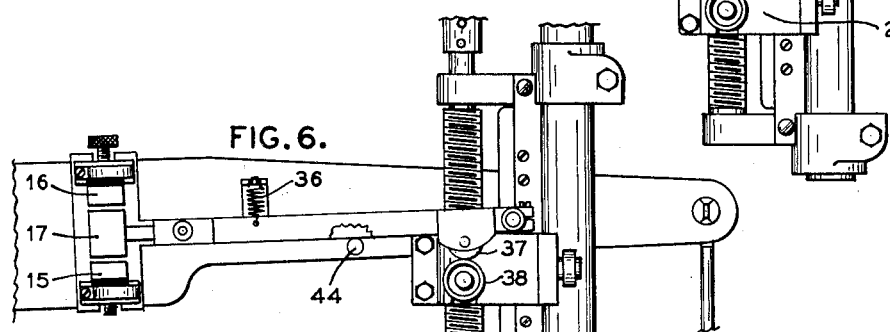
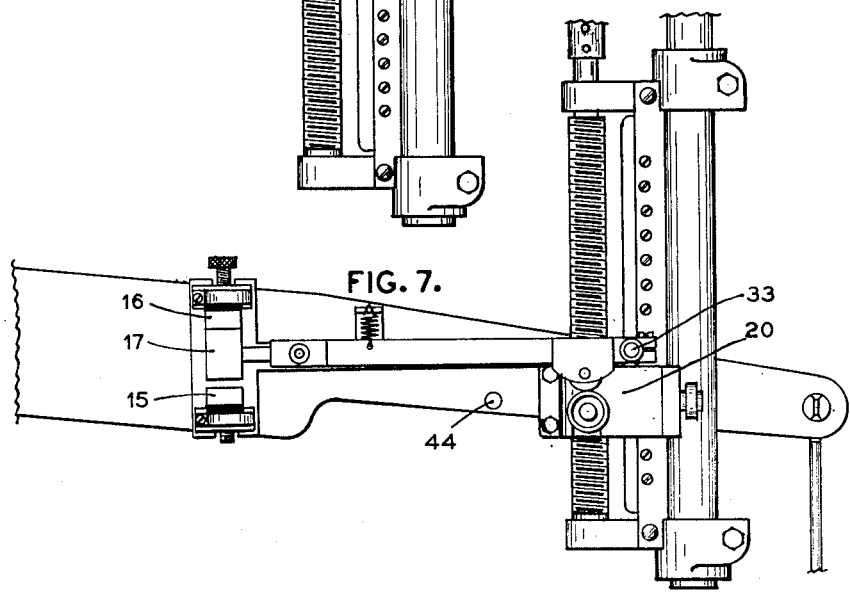

May 12, 1936.                M. E. BRENDEL                2,040,072
                    WEIGHT INDICATING MECHANISM AND THE LIKE
                    Filed Sept. 9, 1932        11 Sheets-Sheet 5
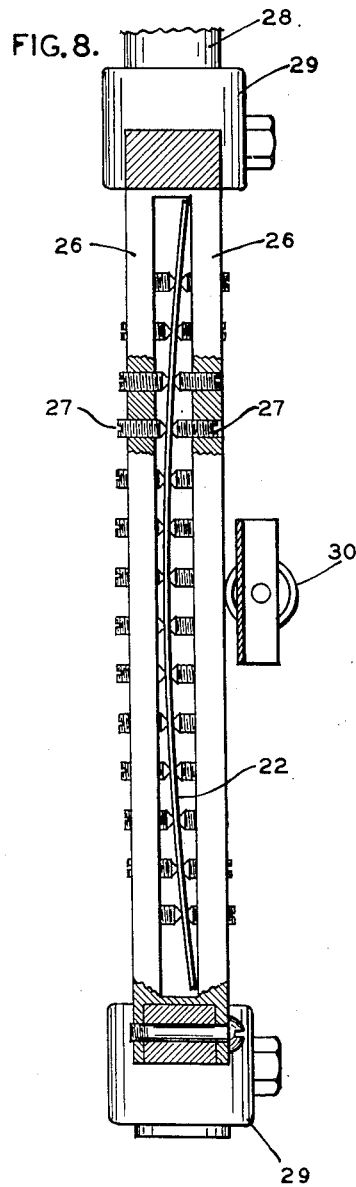
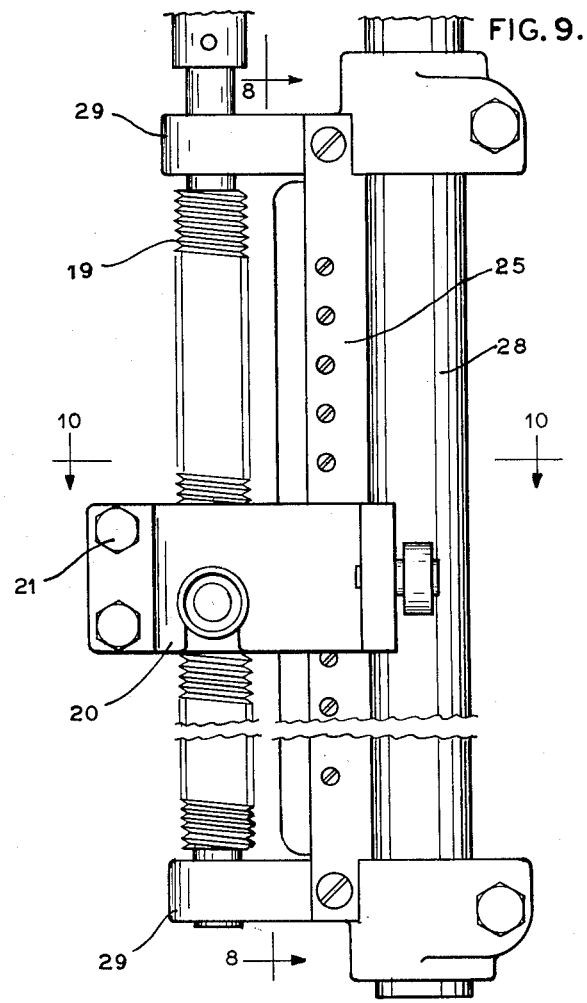
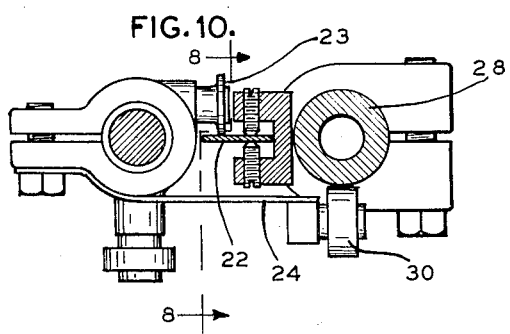
INVENTOR
MAX E. BRENDEL
BY *Roland C. Rehm*
ATTORNEY May 12, 1936.  M. E. BRENDEL  2,040,072

WEIGHT INDICATING MECHANISM AND THE LIKE

Filed Sept. 9, 1932   11 Sheets-Sheet 6

INVENTOR
MAX E. BRENDEL
BY Roland E. Rehm
ATTORNEY

May 12, 1936.  M. E. BRENDEL  2,040,072
WEIGHT INDICATING MECHANISM AND THE LIKE
Filed Sept. 9, 1932  11 Sheets-Sheet 7
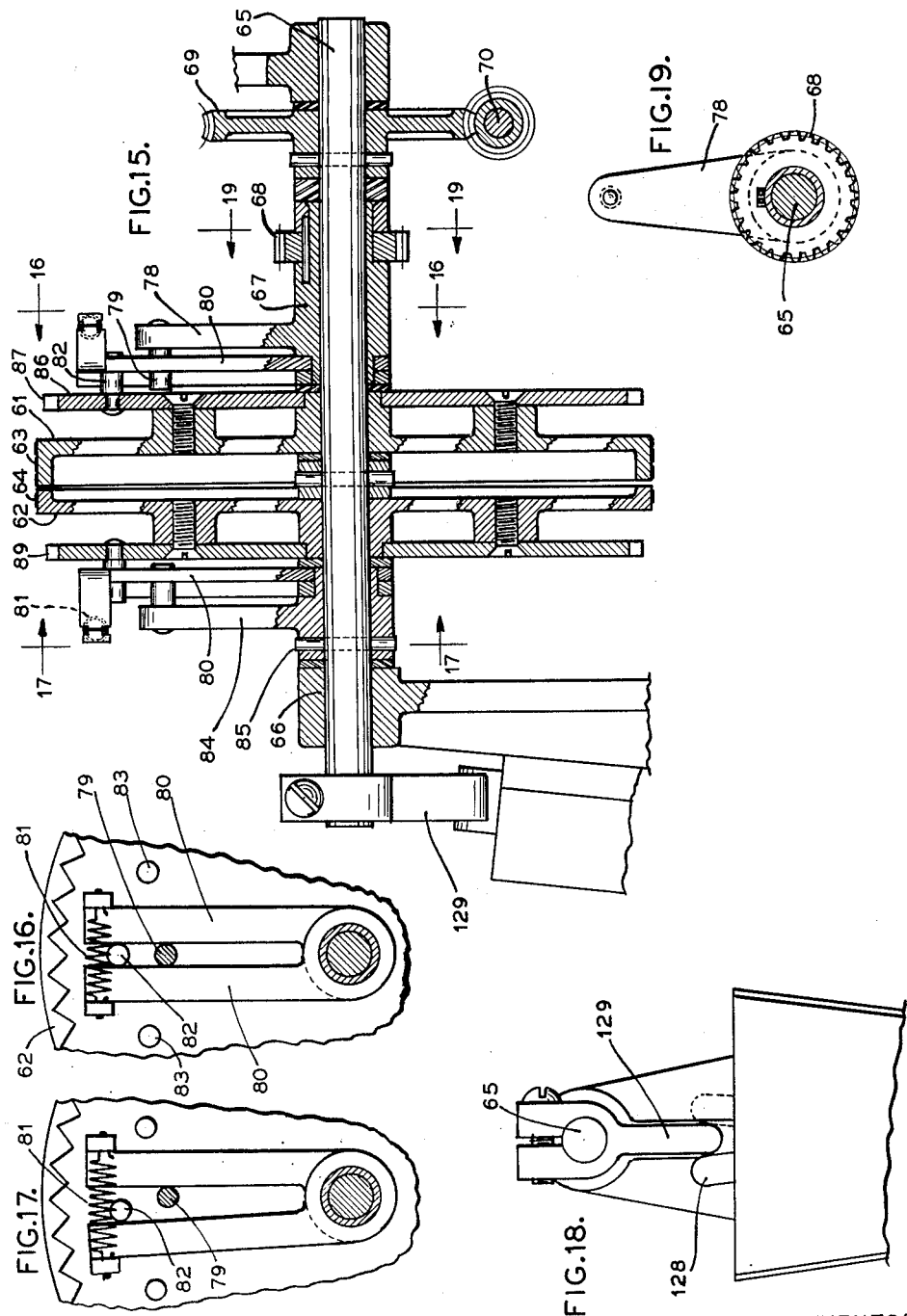
INVENTOR
MAX E. BRENDEL
BY Roland C. Rehm
ATTORNEY May 12, 1936.   M. E. BRENDEL   2,040,072
WEIGHT INDICATING MECHANISM AND THE LIKE
Filed Sept. 9, 1932   11 Sheets-Sheet 8

INVENTOR
MAX E. BRENDEL
BY Roland C. Rehm
ATTORNEY

May 12, 1936.    M. E. BRENDEL    2,040,072
WEIGHT INDICATING MECHANISM AND THE LIKE
Filed Sept. 9, 1932    11 Sheets-Sheet 9
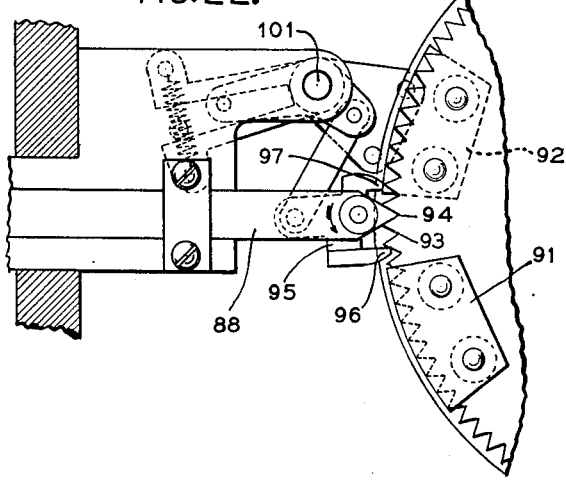
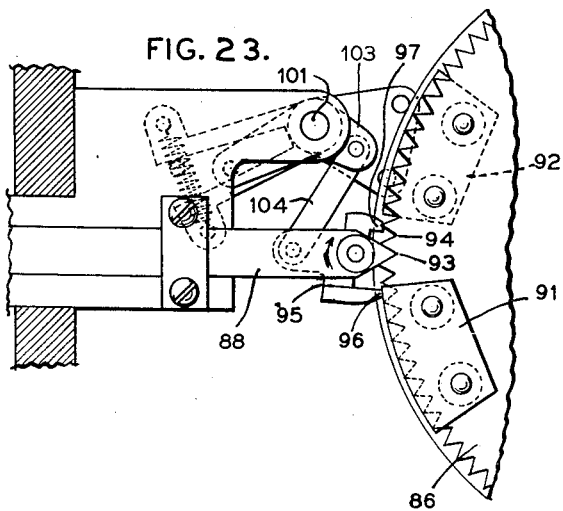
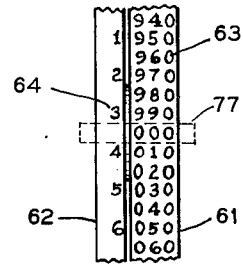
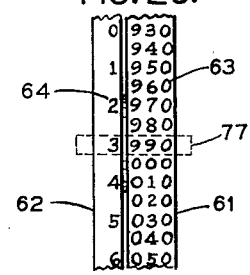
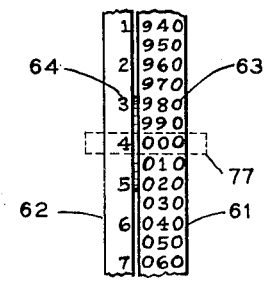
INVENTOR
MAX E. BRENDEL
BY *Roland C. Rehm*
ATTORNEY

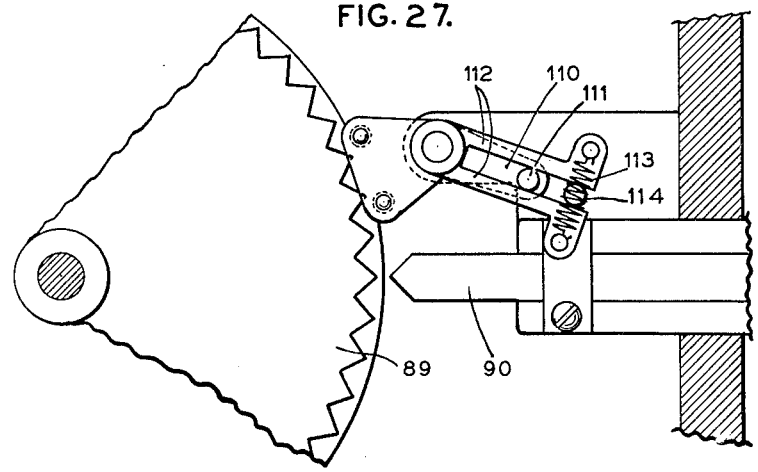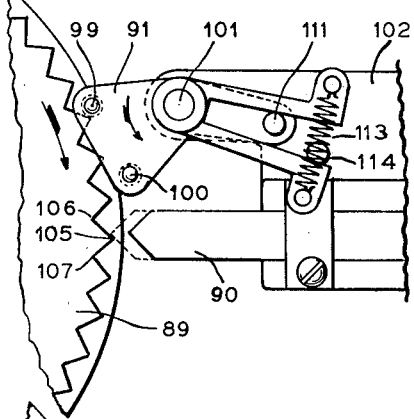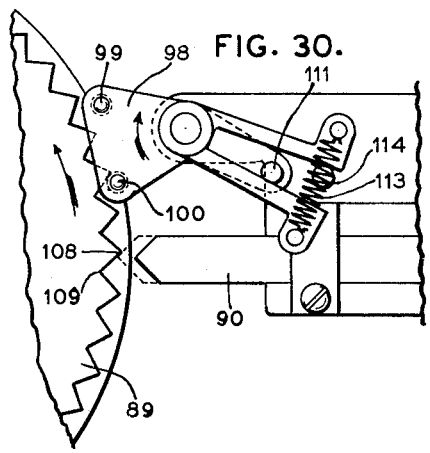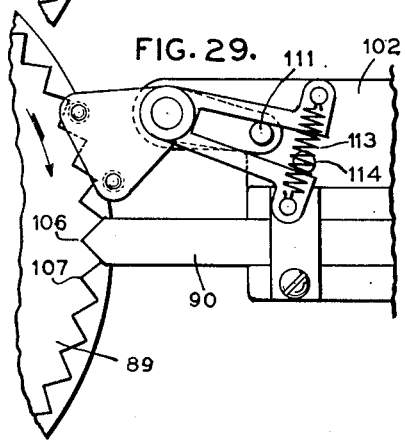

May 12, 1936.  M. E. BRENDEL  2,040,072

WEIGHT INDICATING MECHANISM AND THE LIKE

Filed Sept. 9, 1932  11 Sheets—Sheet 11

INVENTOR
MAX E. BRENDEL

BY *Roland C. Rehm*
ATTORNEY

Patented May 12, 1936

2,040,072

UNITED STATES PATENT OFFICE 2,040,072

WEIGHT INDICATING MECHANISM AND THE LIKE

Max E. Brendel, Chicago, Ill., assignor to Streeter-Amet Company, Chicago, Ill., a corporation of Illinois Application September 9, 1932, Serial No. 632,351

18 Claims. (Cl. 265—6)

This invention relates to indicating or recording apparatus for scales and the like, and among other objects aims to provide an efficient and improved apparatus for quickly and accurately indicating or recording scale weights and the like.

The nature of the invention may be readily understood by reference to one illustrative construction embodying the invention and shown in the accompanying drawings.

In said drawings:

Fig. 5 is a similar elevation showing the relation of the elements while the scale beam is traveling upward, in which position the controlling switch is engaging the lower contact;

Fig. 6 is a similar elevation showing the relation of the parts with the scale beam balanced under load;

Fig. 7 is a similar view showing the relation of the parts when the scale beam is moving downward toward its zero position, the control switch contacting with the upper contact member;

Fig. 8 is an elevation of a calibrating or compensating bar viewed approximately from the planes 8—8 of Figs. 9 and 10;

Fig. 9 is a side elevation of the compensating bar together with the actuator for the weight indicating mechanism;

Fig. 10 is a plan section taken on the plane 10—10 of Fig. 9;

Fig. 15 is a vertical axial section taken on the plane 15—15 of Fig. 2 through the weight indicating or printing wheels and their driving mechanism;

Fig. 16 is a fragmentary sectional elevation taken on the plane 16—16 of Fig. 15, of the mechanism for permitting the adjustment of the units printing wheel;

Fig. 17 is a similar view, taken on the plane 17—17 of Fig. 15, showing the relative arrangement of the parts when the printing wheel is in adjusted position;

Fig. 18 is a detail elevation taken from the left hand end of Fig. 15 showing a protecting limit switch;

Fig. 19 is a sectional elevation taken from a plane 19—19 of Fig. 15 and showing the driving connection with the units printing wheel;

Fig. 22 is a detail view similar to that of Fig. 20 showing the selective operation of the adjusting mechanism near a zero reading;

Fig. 23 is a similar view showing the selective operation of the mechanism when the fast printing wheel is just under the zero reading, Fig. 22 showing the position when it was in a position just above the zero reading;

Fig. 24 shows the units or fast printing wheel in the critical position and before the same has been adjusted in one direction or the other;

Fig. 25 shows the printing or indicating wheels adjusted from the critical position where the reading on the "units" wheel is slightly under zero;

Fig. 26 shows another adjustment of the printing wheel where the position of the "units" wheel has been just above zero;

Fig. 27 shows mechanism for adjusting the slow printing wheel ("tens" or "thousands" as the case may be) to bring the reading thereon into indicating or printing position;

Figure 2:
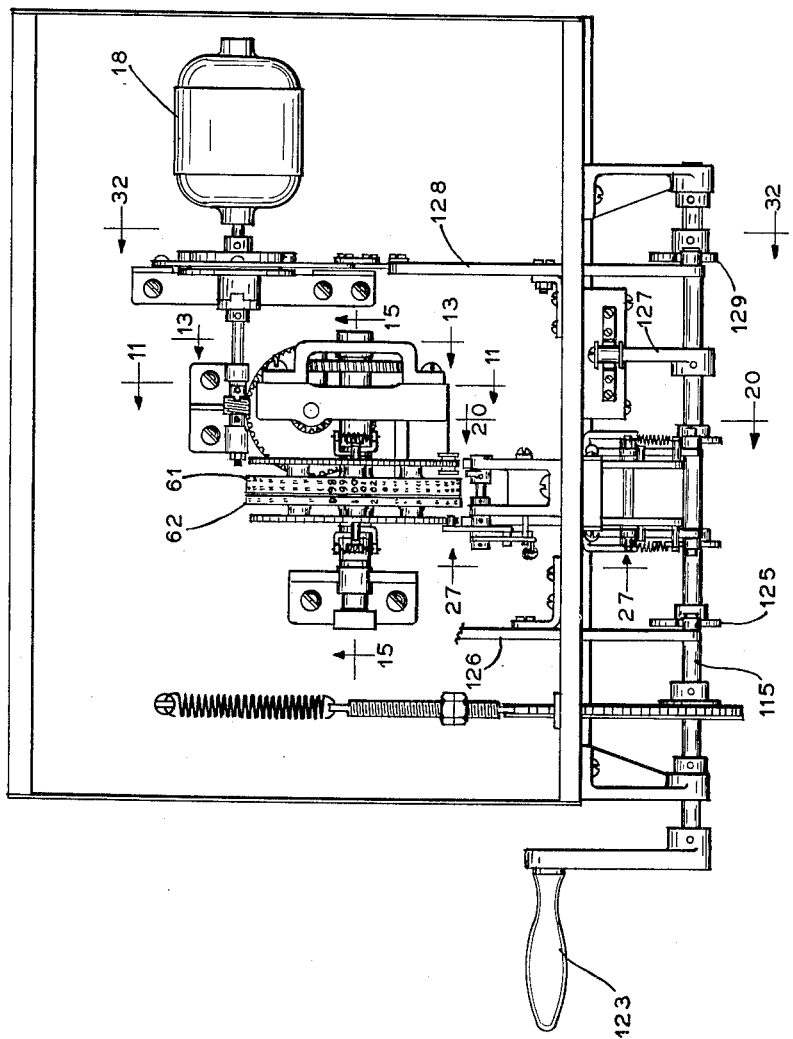
Fig. 2 is a plan view of the apparatus below the weight printing mechanism and taken approximately from the plane 2—2 of Fig. 1.
Figure 3:
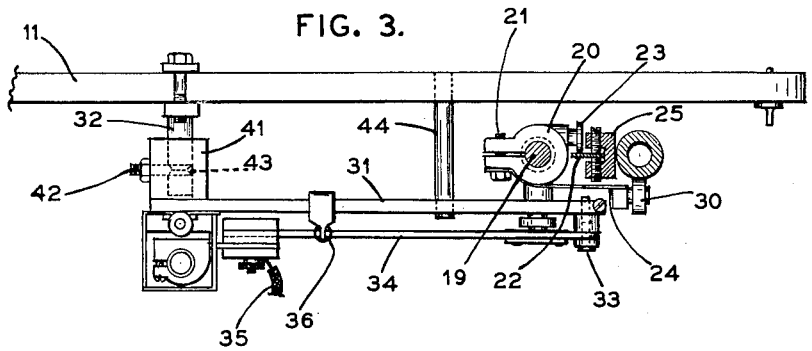
Fig. 3 is a plan section, taken approximately on the plane 3—3 of Figs. 1 and 4, of the weight indicator controlling mechanism.
Figure 4:
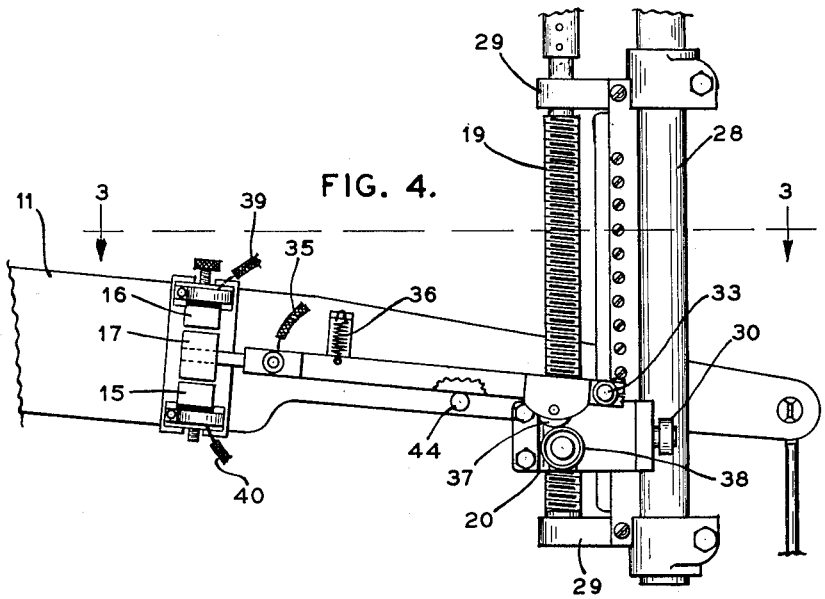
Fig. 4 is an elevation of the aforesaid weight indicator controlling mechanism showing the relation of the various members with the scale beam balanced at zero weight.
Figure 35:
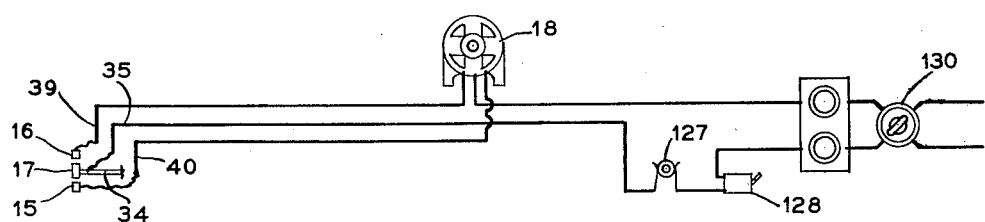
Figure 12:
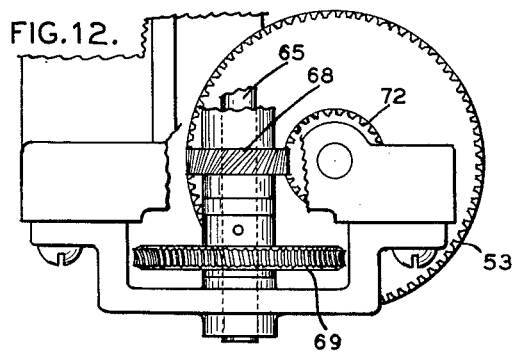
Fig. 12 is a plan view of the mechanism shown in Fig. 11.
Figure 14:
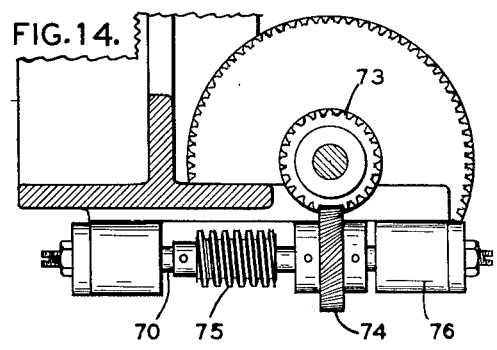
Fig. 14 is a plan view of the mechanism shown in Fig. 13.
Figure 11:
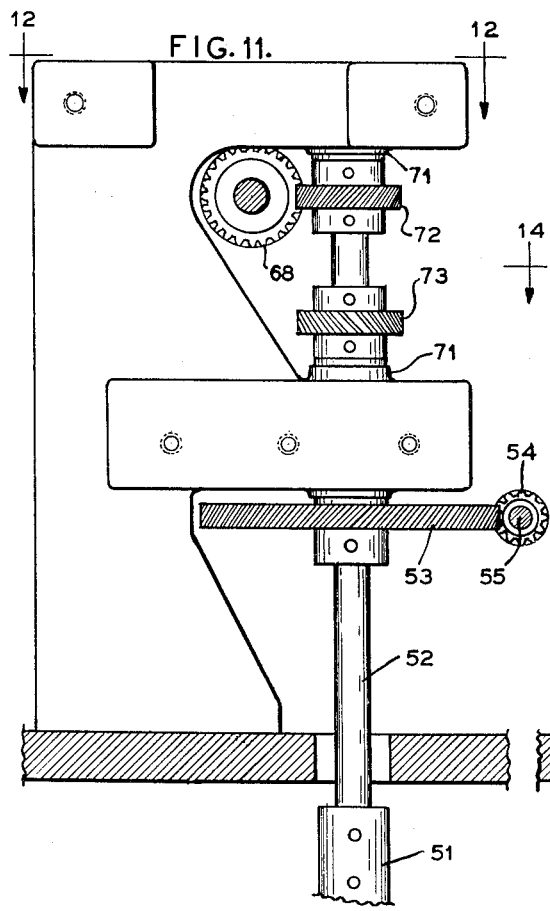
Fig. 11 is a sectional elevation of a driving train in the weight indicating mechanism and taken approximately on plane 11—11 of Fig. 2.
Figure 13:
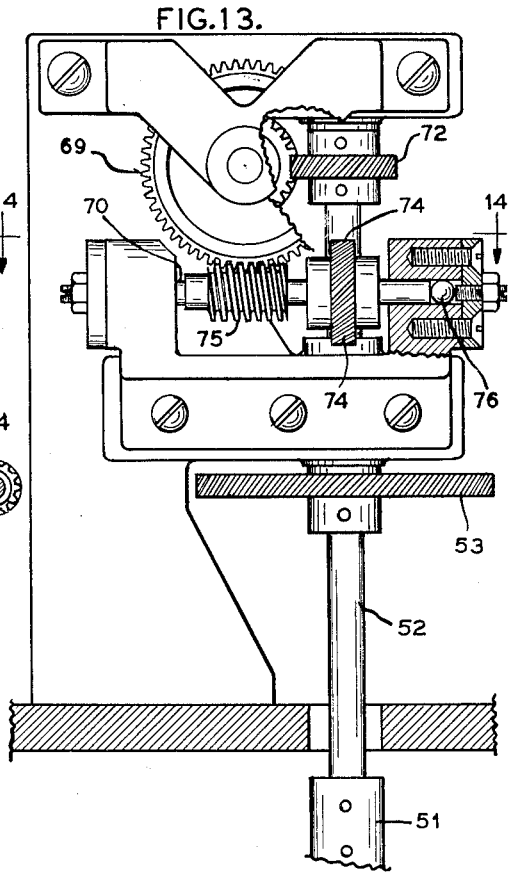
Fig. 13 is a sectional elevation similar to that of Fig. 11 but taken approximately on the plane 13—13 of Fig. 2.
Figure 32:
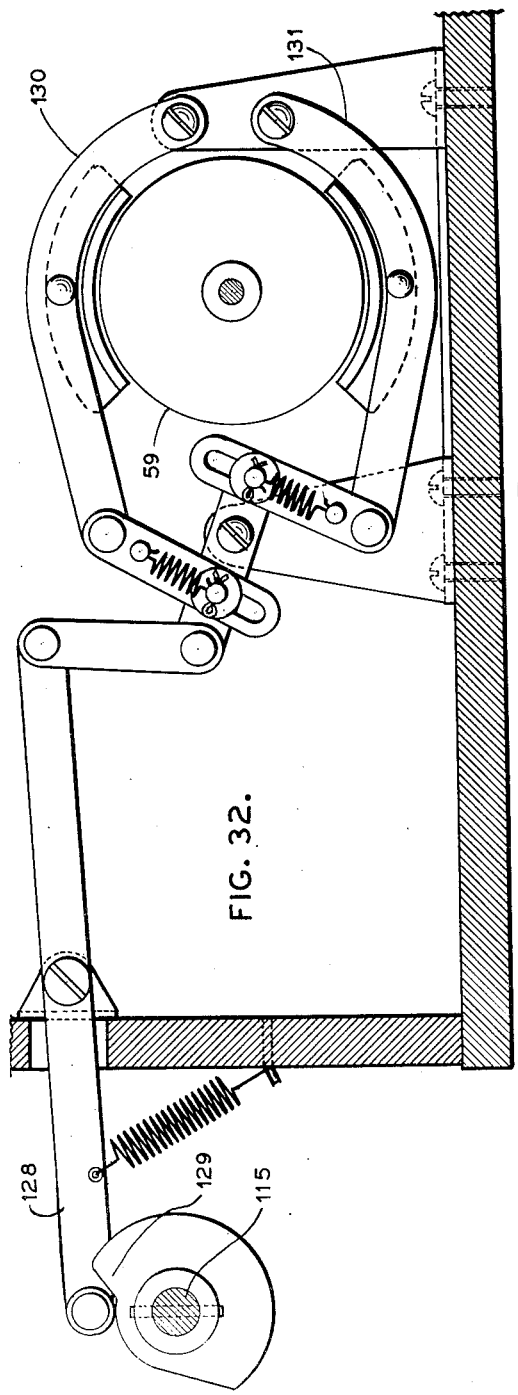
Figure 31:
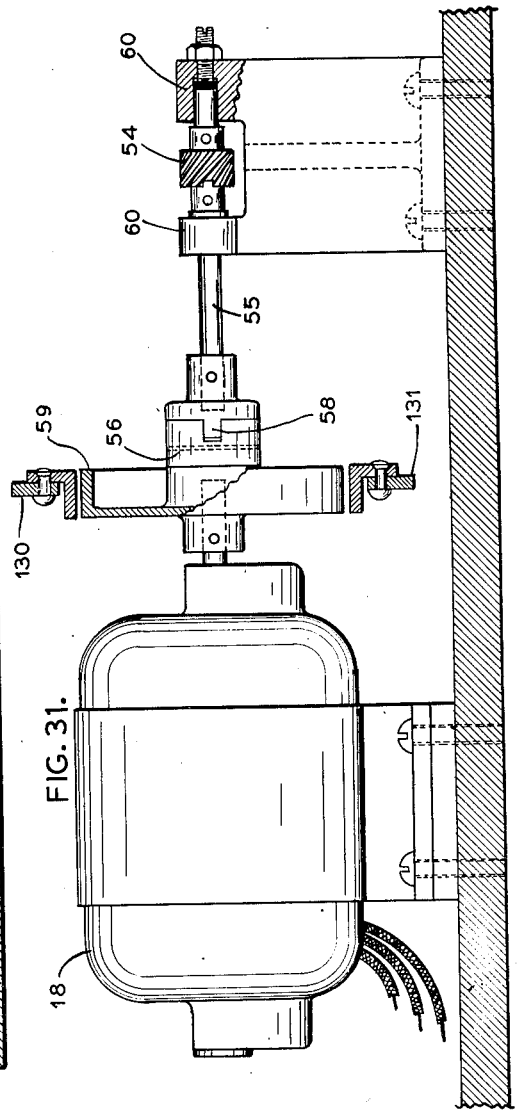
Figure 33:
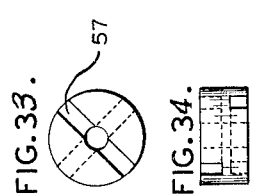
Figure 34:
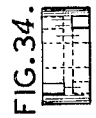

Figs. 28, 29, and 30 show various positions of adjusting mechanism depending upon the direction in which rotation of the slow printing wheel is necessary to bring the reading into printing or indicating position;

Fig. 31 is an elevation of the actuating motor and its brake;

Fig. 32 is a transverse sectional elevation taken on the plane 32—32 of Fig. 2 and showing the motor brake and its actuating mechanism;

Figs. 33 and 34 are plan and elevation views respectively, of a coupling element employed in the motor drive; and Fig. 35 is a wiring diagram of the weight indicator controlling mechanism.

The invention is here shown embodied in an apparatus for indicating or recording weights on a beam scale. The scale platform, main scale beams and their supporting pivots are of the conventional character and are not here shown, it being understood that the scale platform and its beams are connected to the weight indicating mechanism through the rod 10 by which the scale beam and associate indicating mechanism is made responsive to the weight or load on the scale platform. The secondary beam 11, hereinafter called for convenience the scale beam, is counter-balanced by a spring 12 which is generally though not here shown, enclosed in a housing having a thermostatically controlled heating element by means of which the spring is maintained at a uniform temperature. Details of this character are well known in scales on the market and form no part of this invention, it being understood that through the counterbalancing action of the spring 12 the scale beam has a movement of about five inches near its end, which range of movement is utilized to indicate or record scale weights.

Recording mechanism of this character is advantageously employed for indicating or recording a rapid succession of weights, such as weights of moving, coupled cars in a train, as the cars successively pass over the scale platform. By means of dash-pot mechanism 13 of a character now on the market and which is not specifically pertinent here, the scale beam may be brought to rest in weight indicating position in three or four seconds after the application of the load; and it is therefore obviously desirable that the weight indicating or recording mechanism be capable of indicating or recording the weight promptly after the scale beam comes to rest. This will enable rapid weighing.

In the present apparatus, the weight indicating or recording mechanism is controlled but not actuated by the movements of the scale beam, and is set into operation immediately upon the movement of the scale beam so as to follow the scale beam and thereby indicate a correct reading promptly after the scale beam has come to rest. In other words it is not necessary to wait until the scale beam comes to rest before actuating the recording mechanism,—the latter very closely follows the movements of the scale beam even though not directly actuated thereby, as will presently appear.

The actuator for the weight indicating mechanism is in this case electrically operated and controlled, and may advantageously be of the type shown in the co-pending Brendel application, Serial No. 446,596. The nature of this mechanism will be briefly described here. As shown the scale beam carries an electric reversing switch 14 which is pivotally mounted thereon and comprises a pair of contacts 15 and 16 preferably presenting carbon faces each of substantial area (one square inch in the present case) to minimize the effects of sparking, and a movable intermediate contact element 17 which is controlled by the scale beam and engages one or the other contact 15 or 16 when it is desired to actuate the weight indicating mechanism in response to movements of the scale beam. An intermediate position of the contact member 17 (such as shown in Fig. 6 for example) is assumed when the weight indicating mechanism has been moved to a position in which it correctly indicates the true weight as represented by the balanced position of the scale beam; and under such circumstances the indicating mechanism is also at rest.

In the present case the reversing switch actuates a reversing electric motor 18 (see Figs. 2 and 31) which by means of an appropriate driving train rotates screw shaft 19 on which travels the actuator or follower 20 whose movements are made to respond to the movements of the scale beam. The motor may advantageously be of a type having two oppositely wound fields, one field being connected with contact 15 and the other with contact 16. Thus a reversal of motor (accomplished by reversing the current of the field relative to the armature) is effected solely by establishing a circuit through contacts 15 or 16 (as the case may be) without any intervening mechanism.

The operative travel of the follower on the screw shaft 19 is approximately that of the range of movement of the scale beam, namely about five inches in this instance. The shaft is here shown provided with a thread having a pitch of ten threads to the inch. As will presently appear, a given weight on the scale platform causes the follower 20 to be moved vertically to a predetermined position which represents the indicated weight, and the weight indicating mechanism which is in the present case connected with the driving train for screw shaft 19, thus likewise assumes a predetermined position for a given weight on the scale or a given position of the follower 20 relative to the shaft 19.

As shown more particularly in Figs. 3 to 10, the follower 20 is in the form of a split nut through which the screw 19 is threaded and which is adapted to travel up and down thereon when the latter is rotated. Headed screws 21 serve to adjust the nut to the screw to eliminate free play or lost motion. The nut is held against rotation as it travels up and down by a guide 22 along which the roller 23 travels and in engagement with which it is held by the leaf spring 24.

The guide 22 here represents means for adjusting and calibrating the scale in order to compensate for the slight deviation from Hook's law of the movements of the follower caused by the circumstance that the scale beam travels in an arc (wherein the length of the arc traversed by the scale beam is proportional to the weight applied) whereas the follower 20 whose position on the screw 19 controls the indication of weight, travels in a straight line. Correction in this instance is easily effected by bending the guide 22 slightly to cause it to rotate the follower 20 slightly on the screw. This curvature is indicated in exaggerated form (to facilitate explanation) in Fig. 8 wherein the guide 22 is carried in a bracket 25 between opposed arms 26 provided with a series of opposite screws 27 which may be mutually advanced and retracted to give the bar 22 the desired configuration. The bracket 25 is here shown supported upon the bar 28 which also provides the bearing supports 29 for the screw 19. The bar 28 also provides a purchase point for the other end of spring 24 which carries a roller 30 adapted to run up and down on the bar. The spring 24 tends to curve and the resistance presented by the bar causes its other end to hold roller 23 against the guide bar 22.

The guide adjusting screws 27 are also adapted to calibrate the scale. This is done by applying successively a series of standard weights and adjusting the screws 27 until the weight indicator exhibits the correct weight reading. The aforesaid arrangement provides an adjustment whose accuracy is appropriate to the sensitiveness of the scale indicator and its controlling mechanism. As elsewhere stated, the indicator is sufficiently sensitive to indicate hundredths of a single revolution of the screw 19. Assuming that the screw is three-quarters of an inch in diameter, the control mechanism is sufficiently sensitive to indicate peripheral movements of the screw of approximately twenty-four thousandths of an inch, that being one-hundredth of the outer circumference of slightly less than two and three-eighths inches. From the foregoing it will be appreciated that only a slight adjustment of the bar 22 is necessary to effect a change in reading on the weight indicator.

The sensitiveness of the scale is in this instance particularly attributable to an electric switch requiring substantially no power to operate, which controls the weight indicating mechanism. No part of the energy of the scale beam is therefore consumed in operating the weight indicating mechanism. As here shown, particularly in Figs. 3 to 10, the movable contact 17 of the electric switch is controlled by beam operated movement multiplying mechanism in the form of a series of levers which alternately move the contact 17 into engagement with either stationary contact 15 or 16, thereby operating the indicator motor in one direction or another until the weight indicator responds to the balanced position of the scale beam. The aforesaid levers in the present case comprise a main lever 31 pivotally mounted on a bracket 32 carried by the scale beam. Pivoted at 33 adjacent the other end of the lever is a switch control lever 34 carrying at its extremity the movable switch contact 17. The slight weight of the lever, contact point and flexible electric wire 35 connected with the contact point is counter-balanced by a light tension spring 36 suspended from lever 31. Near its pivot, lever 34 carries a roller 37 adapted to engage the roller 38 on follower 20.

The switch mechanism comprising a supporting fitting 41 and the stationary contacts 15 and 16 insulated therefrom and also the flexible electric wires 39 and 40 leading thereto, are likewise carried on pivot pin 32. It should be understood that sufficient slack is provided in wires 35, 39, and 40 to allow for a full range of movements of the scale beam. A screw 42 carried by the lever and switch bracket enters a groove 43 in the pivot pin 32 and prevents longitudinal movement of the switch and other parts on the pivot pin while permitting their rotation thereon.

A pin 44 carried by and projecting from the scale beam 11 is adapted to engage main lever 31 (see Figs. 3 to 6).

The operation of the control mechanism will be apparent from an inspection of Figs. 3 to 10. In general, when the follower lies below its proper weight position as regards that of the scale beam, contact 17 closes the circuit with the lower stationary contact 15, (see Fig. 5). This causes the motor to rotate in a direction which will move the nut 20 upwards. Indeed the action is so rapid that the nut 20 very closely follows the scale beam. When the scale beam falls below the weight position corresponding to that of the follower 20, it causes movable contact 17 to close the circuit through the upper stationary contact 16 reversing the motor and causing the screw to drive the follower 20 down. When the follower is in a weight position which exactly corresponds to the weight position of the scale beam, then the contact 17 is in a neutral position between contacts 15 and 16 and the motor is thus at rest. This condition indicates that the scale beam has come to rest and that the follower 20 has been moved to a weight position which exactly corresponds with the weight position of the scale beam. The foregoing operation of the control mechanism is effected as follows:

Referring to Fig. 5: Whenever the scale beam is above the weight position corresponding to that of the follower 20, the pin 44 engages main lever 31 raising it and causing lever 34 to fall by gravity under the weight of its roller 37 (which is not entirely counter-balanced by spring 36) against contact 15, thus rotating the motor in a direction to drive the follower upward. So long as the circuit through contact 15 remains the follower 20 rises. Eventually its roller 38 engages roller 37 and raises lever 34 carrying it to the neutral position of Fig. 6. If the movement of the nut or the downward movement of the scale beam carries contact 17 beyond the neutral position it then closes the circuit through the contact 16 causing the motor to move the follower 20 down until eventually a stable condition is produced with the contact 17 in neutral position and the motor at rest. In the stable or balanced position the pin 44 and the roller 38 both should engage and support the control levers 31 and 34 respectively.

It should be understood that the gap between the stationary and movable contacts (see for example Figs. 4 and 6) is exagerated for purposes of illustration, the aggregate actual gap in the present instance being $\frac{1}{32}$ inch, ($\frac{1}{64}$ inch on each side of the contact 17 when the latter is in neutral position). This circumstance together wtih the multiplication of movement effected by the positioning of roller 37 close to the pivot point 33 causes the electric contacts to be made and broken upon a very minute vertical movement of follower 20.

The response of the motor to the control mechanism is so prompt that in the use of the apparatus very little "hunting" occurs in establishing a balance. Moreover the rotation of the screw 19 is sufficiently rapid to cause the nut 20 practically to travel at the speed of the scale beam with substantially no lag behind the movements of the latter, which it should be understood, are under the restraint of the dash-pot 13. The absence of substantial lag between the follower 20 and the scale beam very substantially minimizes any "hunting" movement between the motor and its controls on the one hand and the nut 20 on the other in establishing "balanced" condition of the weight indicator.

Referring to Figs. 11 to 15 and 31, the screw shaft 19 is coupled by means of a coupling 51 to a vertical drive shaft 52 carrying a driven spiral gear 53 which is driven by the worm pinion 54 on motor shaft 55. As shown in Fig. 31 the shaft 55 is connected with the motor shaft proper through a coupling 56 (Figs. 33 and 34) carrying transverse slots 57 in its opposite faces located 90° apart. The slots in the coupling are engaged by teeth or tongues 58 respectively on coupling members associated with shaft 55 and the brake drum 59 whose hub is connected directly to the motor shaft. Shaft 55 is carried in bearings 60 and the coupling thus avoids the necessity of securing an absolute alignment between the motor shaft and shaft 55.

The weight indicating elements are here shown in the form of "fast" and "slow" printing wheels 61 and 62, respectively, which carry on their peripheries 63 and 64 printing characters in raised type which serve not only to indicate the weight but to print the same on the record sheet or the like. The printing wheels are designed according to the characteristics of the scale and recording apparatus. In the present case the sensitiveness of the scale and recording apparatus is such that in the usual range of weights weighed on scales of this character, it will record weights in units as small as fractions of one five-thousandth of the maximum weight. In other words, if the scale be designed to weigh up to five thousand pounds it will be sensitive to single pounds. If it be designed to weigh up to ten thousand pounds, it will be sensitive to variations of two pounds. For capacities up to fifty thousand pounds, the scale is sufficiently sensitive to record weights in units of ten pounds.

For purposes of illustration, the printing wheels are shown designed for a scale of a capacity up to fifty thousand pounds. As shown in Figs. 25 and 26, the slow wheel 62 which records the "thousands" of pounds, carries a series of numerals running from one to fifty. The fast or so-called "units" wheel 61 carries a series of numerals running in intervals of ten from zero to and including 990. The fast and slow printing wheels which are coaxial and closely adjacent so that the numbers printed from each will not be widely spaced, are in the present case geared together in a ratio of 50 to 1, that is, the fast wheel must rotate fifty times for each revolution of the slow wheel, and it must make a complete revolution while the slow wheel travels from one number to the next.

Shaft 65 carrying the coaxial printing wheels 61 and 62 is horizontally supported in bearings 66 and is directly connected to the slow printing wheel 62. The fast printing wheel 61 is driven from a sleeve 67 which is rotated by spiral gear 68 independently of shaft 65 which is driven by spiral gear 69 from the shaft 70. The aforementioned 50 to 1 speed ratio between the printing wheels 61 and 62 is effected in this instance by interposing a series of worm reduction gears (see Figs. 11 to 14). The shaft 52 which is axially aligned with the screw shaft 19 is extended between a pair of supporting bearings 71 where it carries a pair of helical gears 72 and 73, the former meshing with gear 68 and serving to drive the fast or "units" printing wheel. Gears 72 and 73 are respectively right and left handed to compensate for the reversing of rotation of the slow wheel by the reducing gears, in order that the printing wheels will rotate in the same direction. Gear 73, meshes with and drives gear 74 on shaft 70 which in turn drives the slow gear 69 through the worm 75. Shaft 70 is provided with thrust bearings 76 to take the thrust imposed thereon by the gears.

Since the printing wheels are thus definitely coordinated with the rotation of the screw shaft 19 which occupies a predetermined rotative position for each position of the scale beam, the printing wheels will give a reading (at a selected position 77, Figs. 24 to 26 which corresponds to the position of the scale beam. The printing wheels are adjustable to permit the alignment of the numbers indicating the weight at the time the record is taken or the weight printed. This avoids the recording of a reading with the wheels so positioned that the reading space 77 falls between a pair of adjacent numerals,—such for example as shown in Fig. 24 where the wheel 62 registers with the reading space at a point intermediate the adjacent numerals.

In the present instance, the "units" wheel is adjusted to bring that unit nearest the space 77 when the scale is balanced, into registry with the space 77. As regards the "thousands" series on the slow wheel 62, however, the arrangement is such as to register the proper "thousand" with the printing space regardless of whether or not it happens to be closer to the reading space 77 than the next number. For example, for all readings of weights between 3000 and 4000 pounds the numeral 3 on the "thousand" wheel 62 will be registered with the printing space 77.

In the present case, the adjusting mechanism is also provided with means to insure the registering of the correct thousands numerals with the reading space 77 when the reading on the "units" wheel approaches the critical point between a pair of readings on the thousands wheel. This occurs as illustrated in Figs. 25 and 26, when the reading on the "units" wheel is in the critical region, in the neighborhood of 990, 000, and 010. The mechanism is operative to select the proper number on the wheel 62. For example, with weights from 3000 to less than 4000, the mechanism is operative to bring the numeral 3 on the wheel 62 into registry with the space 77 and for weights of 4000 and below 5000, the mechanism is operative to bring the numeral 4 on wheel 62 into registry with the space 77.

The foregoing functions are effected in the present instance by allowing a slight relative movement between the printing wheels and their respective driving elements for the purposes of adjustment when the weight reading is taken, the wheels being restored to their normal location relative to their driving elements after the reading has been taken. The mechanism for permitting such relative movement is illustrated in Figs. 15 to 17 wherein the wheel 61, for example, is driven from sleeve 67 by an arm 78 having a pin 79. A pair of arms 80 mounted and freely rotatable on the sleeve are resiliently pulled against pin 79 from opposite sides by spring 81. Drive is transferred from the arms 80 to the wheel 62 by a pin 82 rotatable with the printing wheel. Thus as indicated in Fig. 17, the printing wheel may be rotated in either direction through a small angle independently of its driving element represented by the pin 79. Pins 83 limit the amount of relative movement.

Similar or identical elements are provided to permit rotation of the slow printing wheel 62 relative to its driving shaft. It should be noted in this instance that the driving shaft 65 is operatively connected with the rotating arm 84 (which is similar to the arm 78) by means of a transverse pin or key 85.

To effect the aforesaid adjustment, the units wheel 61 is provided with a disk 86 having peripheral tapering teeth 87 whose spacing corresponds to that of the numbers on the wheel. As shown in Fig. 15, this disk is appropriately fixed to the printing wheel and carries the pin 82 by means of which it and the printing wheel are driven by the mechanism just above described. A pointed finger 88 corresponding in shape to the space between the teeth 87 is adapted to move toward the disk after the scale and associated mechanism have come to a balance, and by engagement with one or the other faces of adjacent teeth to exert a camming action on the disk which rotates it either in a clockwise or counterclockwise direction against the tension of spring 81, thereby bringing the nearest unit on the printing wheel into registry with the printing position 77. It should be understood that the finger 88 is so located and the disk 86 so positioned relative to the printing characters on the printing wheel that when the finger is in the bottom of one of the notches in the disk it will bring a printing character into exact registry with the printing space 77. The finger 88 has in the present instance a reciprocatory movement toward and from the disk imparted to it by mechanism which will presently be described.

After the release of the printing wheel by the withdrawal of the finger, it returns to its initial position under the action of the spring 81 which operates on the pin 79 (in the case of the fast wheel) to return it to radial alignment with the pin 82.

As here shown, the adjustment of the slow printing wheel 62 is dependent to some extent on a preadjustment of the "units" printing wheel 61. For registering a printing character with the printing space wheel 62 is equipped with a similar peripherally toothed disk 89 whose driving mechanism is similar to that for the fast wheel 61 (see Fig. 15). A reciprocating finger 90 whose end is pointed to fit into a notch between teeth on disk 89 (see Figs. 27 to 30) is adapted in a manner similar to the operation of finger 88 to register a printing character with the printing space. Both fingers 88 and 90 are adapted to hold the printing wheels immovably while the weight is printed.

To insure a correct adjustment in printing position of the slow printing wheel 62 particularly where the fast wheel is in critical position (see Figs. 24 to 26), the adjusting mechanism is in the present instance provided with cam mechanism which determines the adjustment of the slow wheel by reference to the position of the fast wheel. As explained above, the critical position where possibility of maladjustment of the slow wheel might otherwise result, occurs just adjacent to the zero reading on the "units" wheel, that is, at the point near where a change from one numeral on the slow wheel to another, is about to occur. A pair of stops or cams 91 and 92 are affixed to opposite faces of the disk 86 and on opposite sides of the position on the disk which corresponds to the critical region or zero point on the wheel 61 (Figs. 22 and 23). As here shown the notch market 93 corresponds to the 990 figure on wheel 61 and the notch 94 corresponds to the zero position at which point and adjustment to the next number on the printing wheel 62 should occur. Cooperating with the cam members 91 and 92 is pawl 95 pivoted to the finger 88 similar to an escapement and which carries a pair of pawl fingers 96 and 97. The space between pawl fingers 96 and 97 is less than that between cams 91 and 92 and is such that when one finger is in engagement with the face of one cam, the other finger can swing clear of the other cam. Hence when the pawl is carried toward the cams by the forward movement of finger 88, (assuming the printing wheel is in critical position) the pawl is oscillated in one direction or the other depending upon which finger engages a cam. As illustrated in Fig. 22 where the printing wheel is in zero position, finger 97 engages the cam 92 and oscillates in the counter-clockwise direction. In Fig. 23 where the printing wheel is in the 990 position the finger 96 engages cam 91 and rotates the pawl in a clockwise direction.

The opposite directions of oscillation of the pawl, depending upon whether the printing wheel is in the 990 or zero position, is utilized to rotate the slow wheel correspondingly to insure an appropriate adjustment. The mechanism for effecting this is here shown in the form of an escapement member 98 (see Figs. 27 to 30) carrying two pins 99 and 100 adapted selectively to enter a notch in the slow wheel disk 89. The escapement is pivoted at 101 to a stationary support 102 and is provided with an operating arm 103 connected by link 104 to the pawl 95.

The operation of the adjusting mechanism will be readily understood by reference to Figs. 22 to 30. For example, if, as shown in Figs. 22 and 24, the unit wheel be in the zero position corresponding to a weight of 4000 pounds, the entry of finger 88 into zero notch 94 causes a counter-clockwise rotation of pawl 95 and a corresponding counter-clockwise rotation of escapement 98 (see Fig. 28). The latter movement causes pin 99 to engage a tooth on disk 89 and rotate the latter in a clockwise direction which carries the point of tooth 105 a safe distance beyond its critical position substantially in register with the point of finger 90, thus insuring the entry of finger 90 into notch 106 instead of notch 107. The camming action of finger 90 in the illustrative instance rotates the slow disk to bring the numeral 4 into printing position 77 (see Fig. 26).

For further illustration, if the "units" printing wheel be in the 990 position (Fig. 25) it is important that the adjustment of the slow printing wheel 62 be such as to bring the numeral 3 and not the numeral 4 into printing position although the latter numeral is closer to printing position since the weight is just one unit removed from 4000 pounds. Such an adjustment is illustrated in Fig. 23 wherein the finger 88 has entered notch 93 corresponding to the 990 reading on the "units" wheel. The pawl finger 96 in this case engages the other cam 91, resulting in a clockwise rotation of the pawl and a corresponding clockwise rotation of escapement 98 (see Fig. 30). The operation of the latter is to carry the point of tooth 108 beyond its critical position relative to finger 90 and to insure the entry of the latter into the proper notch 109 which further rotates the printing wheel until the number 3 is in register with the printing position.

The escapement 98 and fingers 99 and 100 are so mounted that when the line connecting the fingers is parallel to the tangent to the ends of the teeth on disk 89 the latter will clear the pins without striking them (see Fig. 27). To insure the return of the pins to this position following the recording of each weight, the escapement 98 is provided with an arm 110 carrying a pin 111 which is resiliently held between a pair of arms 112 connected by spring 113. The arms are free to separate against the action of spring 113 as indicated in Figs. 28 to 30 under the positive rotation of the escapement but when the latter is released the spring returns the escapement to neutral position which is determined by the stationary pin 114 carried on the support 102. The neutral position of the adjusting mechanism is illustrated in Fig. 20.

Figure 21:
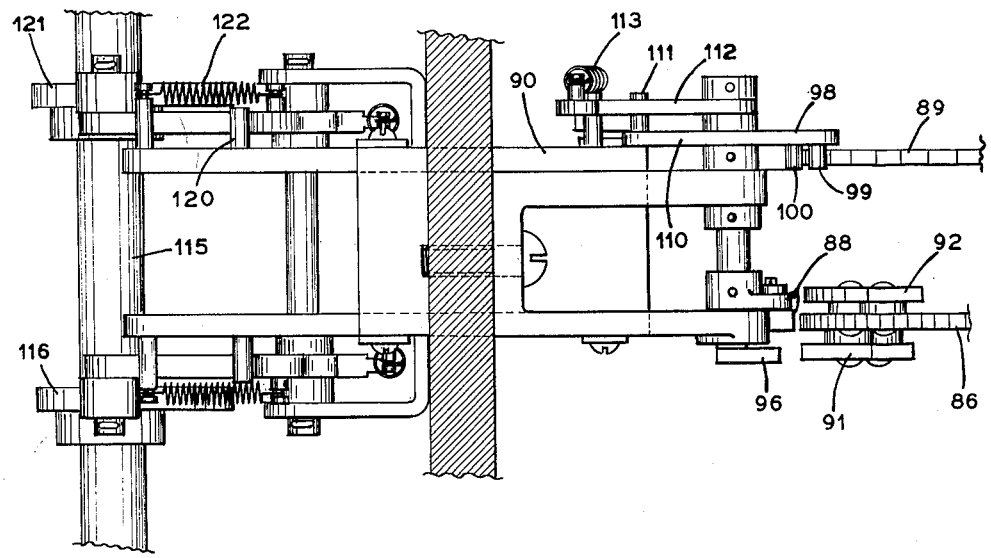
Fig. 21 is a plan view of the mechanism shown in Fig. 20.
Figure 20:
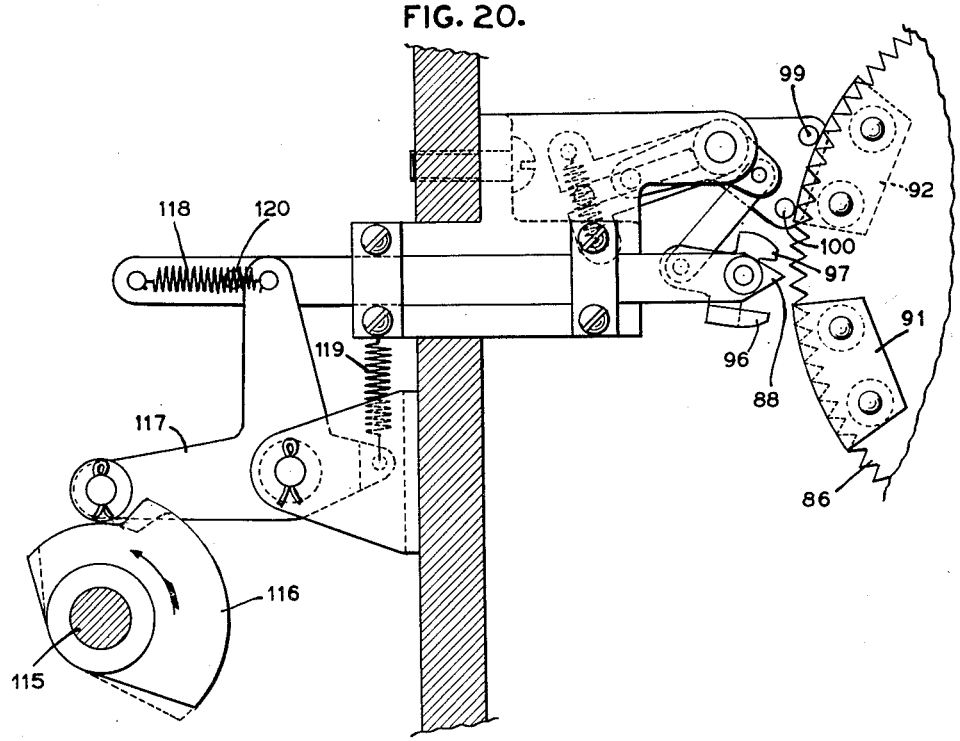
Fig. 20 is a sectional elevation taken approximately on the plane 20—20 of Fig. 2 showing the mechanism for adjusting the printing or indicating wheels.

The above described adjusting mechanism is in the present instance operated by cams carried on shaft 115 (Figs. 2, 20, and 21). A cam 116 is arranged to operate the bell crank arm 117 and is connected through a spring 118 to the finger arm 88. The cam roller is held in operative relation to cam 116 by the action of spring 119. It will be apparent therefore that upon the clockwise rotation of cam 116 bell crank arm 117 operates through spring 118 to move the finger 88 resiliently toward the disk 86. Spring 118 avoids damage in the event of obstructions to the forward movement of finger 88. The finger is withdrawn positively by engagement of the bell crank arm with the projecting pin 120. The adjustment of the fast wheel starts before the slow wheel adjusting mechanism is actuated to allow a sufficient interval to effect an initial adjustment of the slow wheel to insure proper operation of its own adjusting mechanism. This interval is secured by an angular displacement between cam 116 and cam 121 on shaft 115. The latter cam operates a bell crank arm 122 which in turn actuates finger 98 by means of mechanism similar to that illustrated in Fig. 20 (see Fig. 21).

Shaft 115 is operated in the present instance manually by crank arm 123. Automatic or other means for operating the shaft obviously may be provided where desired. It should be noted that the coordinated selectivity of slow and fast wheels is provided for only about ten notches on either side of the critical or zero position. Beyond these points the slow wheel disk 89 is moved by the driving gears to a position where the finger 98 will enter the proper notch for adjustment.

Figure 1:
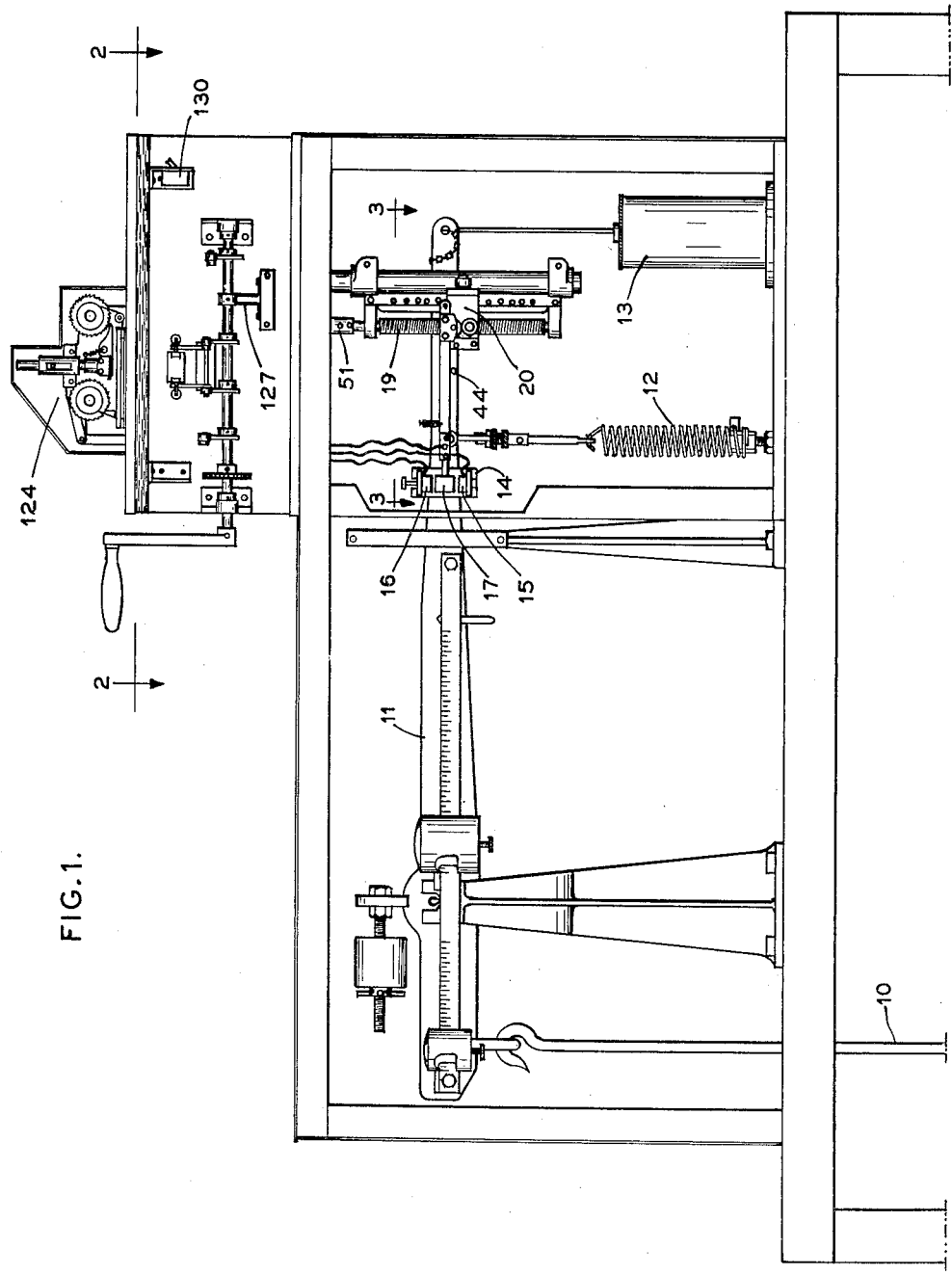
Fig. 1 is an elevation of the secondary or weighing beam of a scale with associate weight indicating and recording apparatus.

After the printing wheels have been adjusted a reading is taken or if a record be desired, the wheels are caused to print on an appropriate record in the form of a tape, card or the like. Typical mechanism is illustrated at 124 (Fig. 1). The particular form of printing mechanism may obviously vary considerably. For example it may comprise a printing hammer in register with the printing position 77. When the printing hammer is tripped, it is adapted to cause the printing wheels to print upon a record sheet or tape through the agency of an interposed inking medium in the form of a ribbon or the like. Actuation of the printing mechanism is advantageously effected through continued rotation of the shaft 115 by means of a cam 125 which operates a lever 126.

Shaft 115 may also advantageously be utilized to open the motor circuit during the printing operation and also to apply brake to the motor shaft to bring it quickly to rest. As here shown a switch arm 127 is mounted on shaft 115 and operates between a pair of contacts. As soon as the switch arm 127 clears the contact, the motor brake (see Figs. 2, 31, and 32) is immediately applied by lever 128 through the action of the operation cam 129. The brake may be in any appropriate form,—that here shown comprises a pair of cooperating brake shoe holding arms 130 and 131 which bring the brake shoes simultaneously into and out of contact with the motor brake drum 59.

It should be understood that the various control cams on shaft 115 are so relatively timed to provide the proper sequence of operations. Such sequence in the present instance is: breaking of the current, application of the motor brake, adjustment of the fast wheel, adjustment of the slow wheel, and finally actuation of the printing or recording mechanism.

It will be apparent from the foregoing that it is not necessary for the motor to return the printing wheels to zero weight reading between weights. This considerably facilitates rapidity of weighing. For automatic recording of weights such as weighing successive cars coupled in a train, it is desirable to incorporate a timing mechanism to control the actuation of the weight recorded in order to allow an interval of three or four seconds for the scale to balance after the application of each weight, thereby avoiding the recording of a false weight. In most instances however the scale balances more rapidly than the rate of application of successive loads.

An electric limit switch here represented by the switch lever 128 and actuated by finger 129 secured to the slow shaft 65 (see Fig. 18) may advantageously be provided to protect the mechanism against attempts to carry the follower 20 tightly against the upper of lower bearings 29 of screw 19. Since shaft 65 makes only one revolution through an entire range of scale weights, it may be utilized to operate the limit switch when an effort is made to rotate the shaft beyond the active range of scale readings on the slow indicator wheel. This avoids driving the nut 20 beyond a safe position on screw 19 and causing it to jam with one of the bearings 29. The latter result might otherwise occur for example if the switch lever were disturbed when the follower were say at its lowest operative position. The disturbance of contact lever 34 under certain cases might cause the motor to drive the nut and jam it with the lower bearing 29. The limit switch operates to open the circuit if movement of the nut beyond its extreme positions is attempted. As here shown, when rotated in one direction beyond its active range finger 129 will move switch lever 128 to the full line position (Fig. 18) to open the circuit. When rotated in the opposite direction beyond its active range finger 129 will similarly open the circuit by moving switch lever 128 to the dotted line position indicated in Fig. 18.

Manually operated switch 130 (see Fig. 1) may advantageously be provided for opening the circuit when the scale is not in use. One arrangement of electric circuits appropriate to the present arrangement is illustrated in Fig. 35, the application of which will be readily understood without description.

Obviously the invention is not limited to the details of the illustrative construction since these may be variously modified. Moreover it is not indispensable that all features of the invention be used conjointly since various features may be used to advantage in different combinations and sub-combinations.

Having described my invention, I claim:

1. In apparatus of the character described, the combination comprising a pair of indicator wheels, one for indicating units and the other for indicating higher decimals, the units wheel having cam means associated with the zero reading, mechanism actuated by said cam means for controlling the other wheel, said cam means being forced to actuate said mechanism to shift the other wheel to bring either one of a pair of adjacent digits on said other wheel into indicating position depending upon whether the indication on the units wheel is zero or below zero.

2. In apparatus of the character described, the combination comprising a pair of indicator wheels, one for indicating units and the other for indicating higher decimals, the units wheel having cam means associated with the zero reading, a series of teeth associated with the other wheel, mechanism actuated by said cam means for engaging a tooth to rotate said other wheel slightly, said cam means being arranged to actuate said mechanism to rotate said other wheel in one direction or another depending upon whether the indication on said units wheel is zero or below zero.

3. In apparatus of the character described, the combination comprising an oscillating scale beam, a relatively rotatable screw and nut, mechanism controlled by the scale beam position for relatively rotating the screw and nut until the nut occupies a position on the screw corresponding to the scale beam position, mechanism controlled by said screw and nut for indicating the weight represented by their position, and adjusting means for permitting rotation of the nut relative to the screw independent of said scale beam controlled mechanism for calibrating said scale.

4. In apparatus of the character described, the combination comprising an oscillating scale beam, a relatively rotatable screw and nut, mechanism controlled by the scale beam position for relatively rotating the screw and nut until the nut occupies a position on the screw corresponding to the scale beam position, mechanism controlled by said screw and nut for indicating the weight represented by their position, and an adjustable guide for said nut to permit independent rotation thereof on said screw to compensate for the error caused by the movement of the scale beam through an arc instead of a straight line.

5. In apparatus of the character described, the combination comprising an oscillating scale beam, a relatively rotatable screw and nut, mechanism controlled by the scale beam position for relatively rotating the screw and nut until the nut occupies a position on the screw corresponding to the scale beam position, mechanism controlled by said screw and nut for indicating the weight represented by their position, and a flexible guide strip for said nut having a series of adjusting screws along the same for flexing said strip to permit independent rotation of said nut on said screw thereby to calibrate said scale.

6. In weight indicating mechanism of the character described, the combination comprising, a rotating screw shaft controlled by the scale beam, a pair of coaxial weight indicating wheels driven from said screw, one wheel being a units wheel and the other for higher decimals, a shaft on which said wheels are carried, one wheel being fixed and the other loose on said shaft, a sleeve on said shaft for driving the loose wheel, a pair of gears on a shaft driven by said screw shaft, one gear for driving said sleeve and the other for driving said wheel shaft, and reduction gearing interposed between one of said gears to drive said decimal wheel at the ratio existing between said units wheel and the decimal wheel.

7. In weight indicating mechanism for scales, the combination comprising a scale beam, electric switch mechanism controlled by said scale beam and including a pair of spaced carbon block contacts whose operative faces are about one square inch in area carried by said scale beam, a movable contact member between said spaced contacts and provided with opposite carbon block contact faces of corresponding area and adapted to contact alternately with the respective spaced contact, said carbon blocks being spaced so that the maximum gap does not substantially exceed one thirty-second of an inch, the large faces of said blocks serving to distribute arcing and thereby to retard increase in the gap through burning, and operating means associated with said movable contact whereby the latter is moved in response to movement of said scale beam.

8. In weighing apparatus of the character described the combination comprising a pair of weight indicating wheels each carrying a series of weight indications, one wheel being a units wheel and the other that of a higher order, said wheels being geared together in a ratio corresponding to that existing between the orders represented by the respective wheels, means for moving said wheels to indicate the weight on a scale, and means for adjusting said wheels to aline the respective weight indications thereon, said units wheel having associated therewith a device for adjusting said higher order wheel forward or back depending on whether the units indication is just above or just below zero.

9. In weighing apparatus, the combination comprising a weight responsive member movable by a load to a position representing the weight of the load, a plurality of relatively movable weight printing wheels for printing respectively the units and higher orders of digits in the weight of a load, mechanism for moving said weight printing wheels to positions determined by said weight responsive member and representing the weight of the load, means for connecting said units printing wheels to said moving mechanism to allow a small temporary movement of the units wheel relatively to said moving mechanism, and a device for temporarily adjusting said units wheel relatively to said moving mechanism to align the nearest printing character with the printing position.

10. In weighing apparatus, the combination comprising a weight responsive member movable by a load to a position representing the weight of the load, mechanism movable to a position to indicate a weight represented by the position of the weight responsive member, a reversible electric motor for driving said mechanism, a pair of spaced carbon contacts of substantial area carried by said load responsive member, a movable contact member carrying a similar carbon contact and movable by both said load responsive member and said mechanism into contact with one or the other of said spaced contacts depending upon the relative positions of said load responsive member and said mechanism, circuits connecting said contacts with said motor so that the latter will drive said mechanism to follow the movements of said load responsive member to a position corresponding to that of the latter, said contacts being adjusted to reduce the gap between them and the movable contact to a small fraction of an inch, the large area of said contacts tending to prevent increase in the gap through burning.

11. In weighing apparatus, the combination comprising a weight responsive member movable by a load to a position representing the weight of the load, a plurality of relatively movable weight printing devices for printing respectively lower and higher orders of digits in the weight of a load, mechanism for moving said weight printing devices to positions determined by said weight responsive member and representing the weight of the load, means for aligning said printing devices so that the various digits of the weight of the load will be in alignment, and means controlled by a printing device of lower order when the latter is in a critical position for temporarily adjusting the printing device of the next higher order before the aforesaid alignment of said printing devices to insure the positioning of the proper higher order digit in printing position.

12. In weighing apparatus of the character described the combination comprising a pair of weight indicating wheels each carrying weight indicating numerals, one wheel being a "units" wheel and the other that of a higher order, said wheels being geared together in a ratio corresponding to that existing between the orders represented by the respective wheels, means for moving said wheels to indicate the weight on the scale, means for aligning the numerals in weight indicating position on the several wheels to place the digits in the indicated weight in alignment, and mechanism controlled by the "units" wheel when the latter is in a critical position near "zero" for temporarily adjusting the wheel of the next higher order before the aforesaid alignment of said numerals to insure the positioning of the proper "tens" digit in weight indicating position.

13. In weighing apparatus, comprising in combination load counterbalancing means including a member adapted to be moved in counterbalancing the load to a position which represents the weight of the load, a plurality of printing devices having printing characters thereon adapted to be set to print the respective "units" and higher digits in the weight of the load, mechanism controlled by said weight representing member for setting said printing devices into position to print the weight represented by said member and including means for setting the printing characters in alignment in printing position so that the digits of the printed weight will be in alignment, and adjusting means operative when the "units" printing device is in a critical position near "zero" to adjust said mechanism before the aforesaid alignment of said printing characters to insure the positioning of the proper "tens" digit in printing position.

14. In weighing apparatus, the combination comprising a scale member movable to a position representing the weight of the load, weight exhibiting mechanism for exhibiting the "units" and higher digits in the weight of a load and including a plurality of rotary devices rotatable to positions representing the respective units and higher digits in the weight of the load, driving means controlled by said scale member for rotating said devices to said positions, mechanism for aligning said rotating devices to place the digits in the exhibited weight in alignment, and means controlled by the "units" device for temporarily adjusting the device of the next higher order before the aforesaid alignment thereof to insure the positioning of the proper "tens" digit in weight exhibiting position.

15. In weighing apparatus, the combination comprising a weight responsive member movable by a load to a position representing the weight of the load, a plurality of relatively movable printing wheels for printing "units" and "tens" digits in the weight of the load, mechanism for moving said wheels from any previous position whether higher or lower to a position corresponding to that of the weight responsive member, means for mounting said "tens" wheel so as to be temporarily movable relative to said moving mechanism to permit alignment of a digit in printing position, and means for insuring the alignment of the proper "tens" digit in printing position.

16. In weight recording mechanism of the character described the combination comprising a plurality of recording wheels having numerals, driving mechanism for rotating said wheels from any previous position whether higher or lower to that representing the weight of the load, said wheels being coordinated to indicate "units" and a higher decimal series respectively, and means for temporarily releasing the driving connection with said mechanism to permit a rotation of said wheels independently of said driving mechanism to align numerals of each of said wheels in recording position, said means restoring the wheels to definite relation with said driving mechanism after a record has been made.

17. In weighing apparatus, the combination comprising a weight responsive member movable by a load to a position representing the weight of the load, weight recording mechanism including a plurality of rotary devices controlling respectively the recording of lower and higher orders of digits of the weight, mechanism controlled by said weight responsive member for moving said rotary devices to positions representing the weight of the load, means for aligning the digits in recording position, and mechanism controlled by a device of lower order for adjusting the next higher device before the alignment of said digits to effect the location of the proper digit of the higher order in printing position.

18. Weighing apparatus comprising in combination load counterbalancing means including a member adapted to be moved in counterbalancing the load to a position which represents the weight of the load, weight printing mechanism including a plurality of printing devices movable to printing position to print respectively the "units" and successive digits in the weight of the load, and adjusting mechanism adapted to connect the "units" printing device with that of a higher order to give the latter an adjustment whose character depends upon whether the "units" device is set near the "zero" position or near the "nine" position.

MAX E. BRENDEL.